United States Patent
Beck et al.

(10) Patent No.: US 12,181,305 B2
(45) Date of Patent: Dec. 31, 2024

(54) METHODS AND SYSTEMS FOR GENERATING LANE LINE AND ROAD EDGE DATA USING EMPIRICAL PATH DISTRIBUTIONS

(71) Applicant: GM GLOBAL TECHNOLOGY OPERATIONS LLC, Detroit, MI (US)

(72) Inventors: Samuel Walker Beck, Dearborn, MI (US); Benjamin Isaacoff, Royal Oak, MI (US); Matthew Kelly Titsworth, Pflugerville, TX (US); Jasmine Kuo, Pflugerville, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 288 days.

(21) Appl. No.: 17/819,881

(22) Filed: Aug. 15, 2022

(65) Prior Publication Data

US 2024/0053166 A1   Feb. 15, 2024

(51) Int. Cl.
*G01C 21/00* (2006.01)
*B60W 60/00* (2020.01)

(52) U.S. Cl.
CPC ....... *G01C 21/3819* (2020.08); *B60W 60/001* (2020.02); *B60W 2420/403* (2013.01); *B60W 2520/00* (2013.01); *B60W 2552/53* (2020.02); *B60W 2556/40* (2020.02)

(58) Field of Classification Search
CPC ............ G01C 21/3819; B60W 60/001; B60W 2552/53; B60W 2556/40; B60W 2420/403; B60W 2520/00
USPC ......................................................... 701/25
See application file for complete search history.

(56) References Cited

U.S. PATENT DOCUMENTS

| | | | | |
|---|---|---|---|---|
| 2019/0347518 | A1* | 11/2019 | Shrestha | G06N 20/20 |
| 2021/0088340 | A1* | 3/2021 | Bulan | G06T 19/006 |
| 2022/0355825 | A1* | 11/2022 | Deo | G06N 3/084 |

FOREIGN PATENT DOCUMENTS

CN          112733273 A  *  4/2021

OTHER PUBLICATIONS

Yijun Wei, Creating Semantic HD Maps From Aerial Imagery and Aggregated Vehicle Telemetry for Autonomous Vehicles, Jan. 11, 2022, IEEE (Year: 2022).*

Boyang Wang, Learning and Generalizing Motion Primitives from Driving Data for Path-Tracking Applications, 2018, IEEE Intelligent Vehicles Symposium (Year: 2018).*

(Continued)

*Primary Examiner* — Elaine Gort
*Assistant Examiner* — Matthias S Weisfeld
(74) *Attorney, Agent, or Firm* — Lorenz & Kopf LLP

(57) ABSTRACT

Systems and method are provided for defining map data used in controlling a vehicle. In one embodiment, a method includes: receiving, by a processor, telemetry data; determining, by the processor, distribution data of a path based on the telemetry data; determining, by the processor, a plurality of sample data based on a trained machine learning model and the distribution data; generating, by the processor, at least one of lane line data and road edge data based on the sample data and a second machine learning model; and storing, by the processor, the map data including the lane line data and road edge data for use in controlling the vehicle.

18 Claims, 6 Drawing Sheets

(56) References Cited

OTHER PUBLICATIONS

Lili Cao, From GPS Traces to a Routable Road Map, Nov. 2009, GIS '09: Proceedings of the 17th ACM SIGSPATIAL International Conference on Advances in Geographic Information Systems (Year: 2009).*

Theologos Bountourelis, Optimal Node Visitation in Stochastic Digraphs, Dec. 2008, IEEE Transactions On Automatic Control, vol. 53, No. 11 (Year: 2008).*

Kyle W. McClintick, Machine Learning-Based Roadside Vehicular Traffic Localization via Opportunistic Wireless Sensing, 2019, IEEE (Year: 2019).*

Jun-Wei Hsieh, Automatic Traffic Surveillance System for Vehicle Tracking and Classification, Jun. 2006, IEEE Transactions On Intelligent Transportation Systems, vol. 7, No. 2 (Year: 2006).*

José Melo, Detection and Classification of Highway Lanes Using Vehicle Motion Trajectories, Jun. 2006, IEEE Transactions On Intelligent Transportation Systems, vol. 7, No. 2 (Year: 2006).*

* cited by examiner

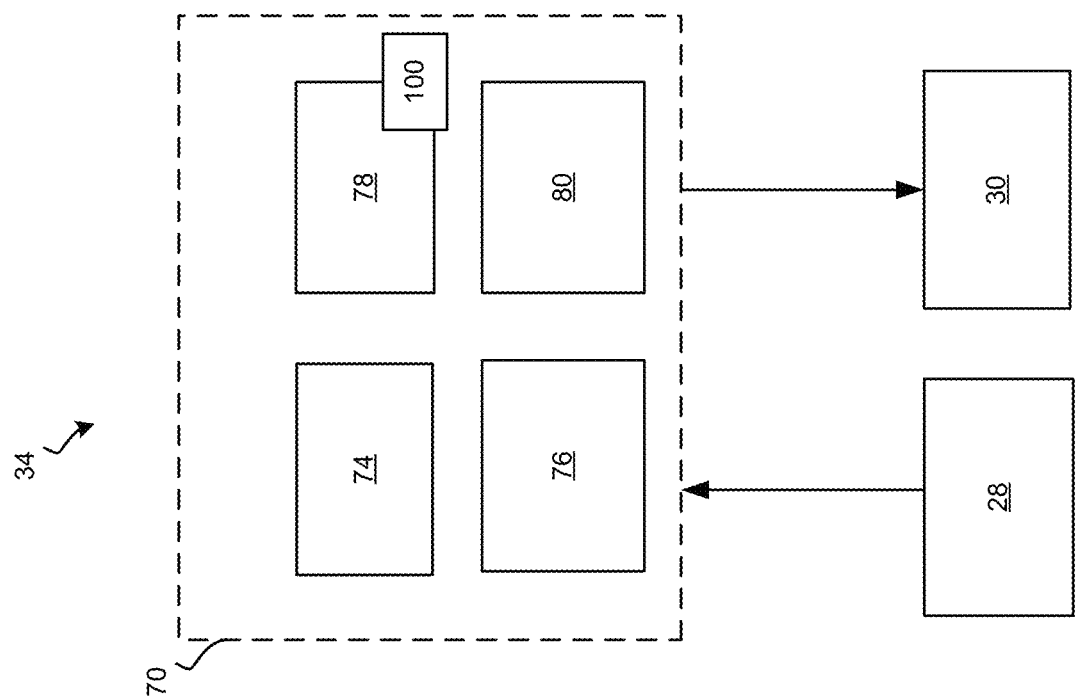

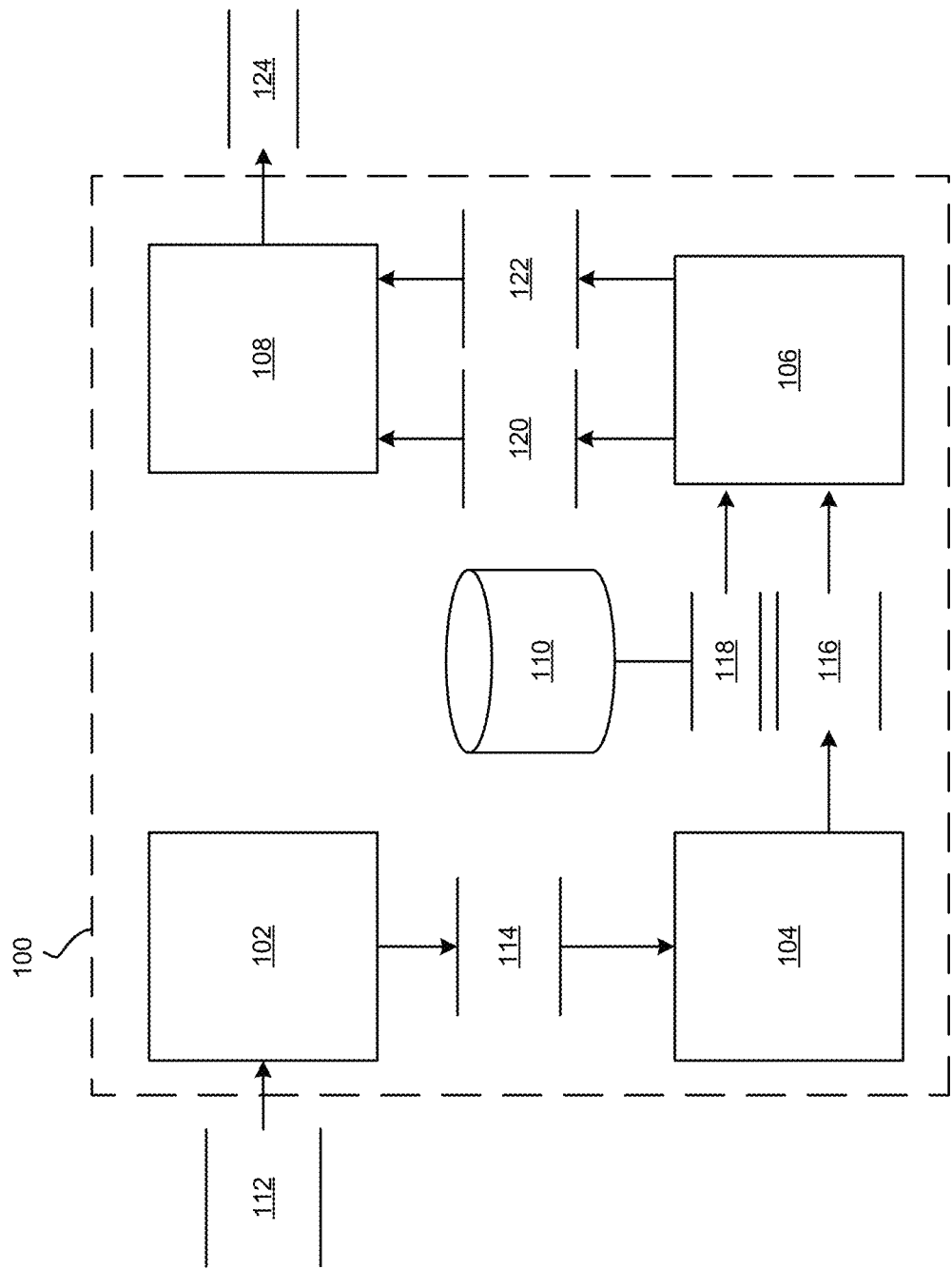

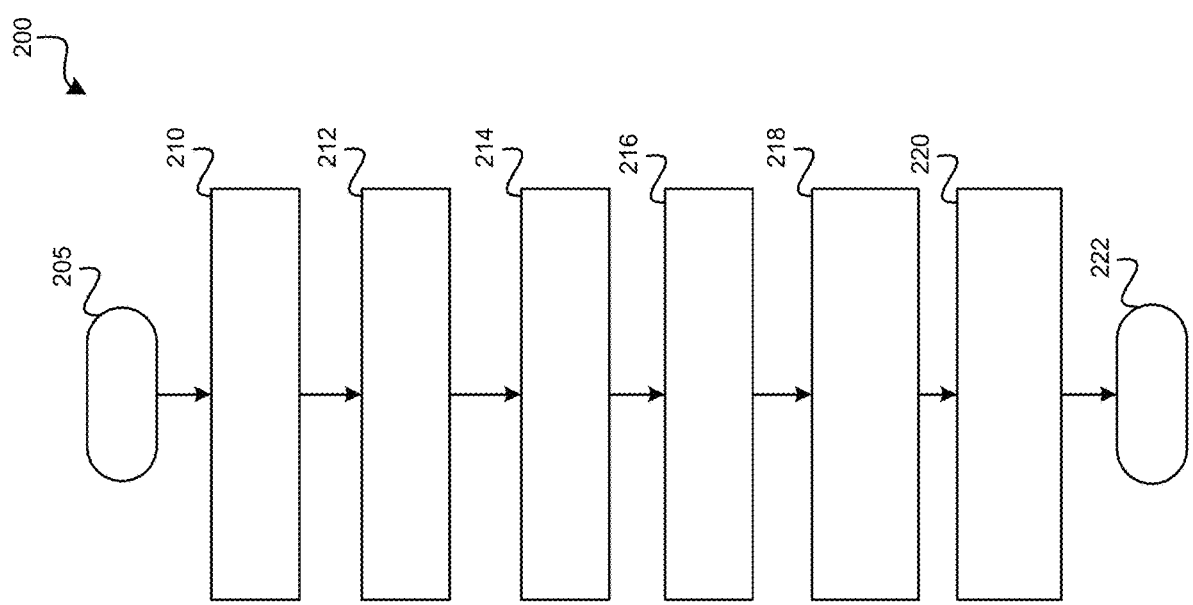

METHODS AND SYSTEMS FOR GENERATING LANE LINE AND ROAD EDGE DATA USING EMPIRICAL PATH DISTRIBUTIONS

INTRODUCTION

The present disclosure generally relates to autonomous vehicles, and more particularly relates to systems and methods for generating lane line and road edge data for a map that is used to control the autonomous vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

While recent years have seen significant advancements in autonomous vehicles, such vehicles might still be improved in a number of respects. For example, in order to navigate, the autonomous vehicle relies on maps that define roadways and lanes within the roadways in the environment. Often times the maps are pre-defined based on aerial imagery and then communicated to the autonomous vehicle for use. Producing maps from aerial imagery may be time consuming and costly.

Accordingly, it is desirable to provide improved systems and methods for generating lane line and road edge data for a map. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for generating map data used to control a vehicle. In one embodiment, a method includes: receiving, by a processor, telemetry data; determining, by the processor, distribution data of a path based on the telemetry data; determining, by the processor, sample data based on a first machine learning model and the distribution data; generating, by the processor, at least one of lane line data and road edge data based on the sample data and a second machine learning model; and storing, by the processor, the map data including the lane line data and road edge data for use in controlling the vehicle.

In various embodiments, the telemetry data includes a position, a speed, a heading, and a time difference observed from an area in an environment.

In various embodiments, the second machine learning model includes a convolutional neural network and the first machine learning model includes expectation maximization model.

In various embodiments, the determining the distribution data comprises determining a transition graph by counting a number of paths visit each pair of nodes in sequence, and including an edge for each pair of nodes that occurs more than a threshold number of times relative to a total number of paths.

In various embodiments, the method includes controlling the vehicle based on the map data.

In various embodiments, the determining the distribution data further comprises initializing, for each node, a conditional distribution to describe a log likelihood of each successor node, and initializing, for each edge between a source node and a target node, a conditional distribution to describe a log likelihood of a position, a speed, a heading, and a time difference at the target node according to a position, a speed, and a heading at the source node.

In various embodiments, the method further comprises using an expectation maximization model to train the distribution data according to the telemetry data.

In various embodiments, the determining the plurality of sample data comprises sampling the distribution data by repeatedly choosing a successor node from a plurality of nodes according to a log likelihood at a current node, and selecting parameters according to the distribution data on an edge corresponding to the successor node.

In various embodiments, the determining the plurality of sample data comprises repeating the choosing and the selecting a plurality of times to produce density image data comprising a density image.

In another embodiment, a computer implemented system for generating map data used in controlling a vehicle includes: a non-transitory computer readable medium configured to store instructions; and a processor configured to perform the instructions in order to carry out a method. The method includes: receiving, by a processor, telemetry data; determining, by the processor, distribution data of a path based on the telemetry data; determining, by the processor, a plurality of sample data based on a first machine learning model and the distribution data; generating, by the processor, at least one of lane line data and road edge data based on the sample data and a second machine learning model; and storing, by the processor, the map data including the lane line data and road edge data for use in controlling.

In various embodiments, the telemetry data includes a position, a speed, a heading, and a time difference observed from an area in an environment.

In various embodiments, the second machine learning model is a convolutional neural network.

In various embodiments, the determining the distribution data comprises determining a transition graph by counting a number of paths visit each pair of nodes in sequence, and including an edge for each pair of nodes that occurs more than a threshold number of times.

In various embodiments, the threshold number of times is relative to a total number of paths.

In various embodiments, the determining the distribution data further comprises initializing, for each node, a conditional distribution to describe a log likelihood of each successor node, and initializing, for each edge between a source node and a target node, a conditional distribution to describe a log likelihood of a position, a speed, a heading, and a time difference at the target node according to a position, a speed, and a heading at the source node.

In various embodiments, the method further comprises using expectation maximization to train the distribution data according to the telemetry data.

In various embodiments, the determining the plurality of sample data comprises sampling the distribution data by repeatedly choosing a successor node from a plurality of nodes according to a log likelihood at a current node, and selecting parameters according to the distribution data on an edge corresponding to the successor node.

In various embodiments, the determining the plurality of sample data comprises repeating the choosing and the selecting a plurality of times to produce density image data comprising a density image.

In another embodiment, a vehicle includes: an autonomous driving system configured to control the vehicle based on map data; and a map definition module configured to, by a processor, receive telemetry data, determine distribution data of a path based on the telemetry data, determine a plurality of sample data based on a first machine learning model and the distribution data generate at least one of lane line data and road edge data based on the sample data and a second machine learning model, and store the map data including the lane line data and road edge data for use in controlling the vehicle.

In various embodiments, the map definition module is further configured to, by the processor, determine the distribution data by determining a transition graph by counting a number of paths visit each pair of nodes in sequence, and including an edge for each pair of nodes that occurs more than a threshold number of times, initializing, for each node, a conditional distribution to describe a log likelihood of each successor node, and initializing, for each edge between a source node and a target node, a conditional distribution to describe a log likelihood of the position, speed, heading, and time difference at the target node according to the position, speed, and heading at the source node, and using expectation maximization to train the distribution data according to the telemetry data.

BRIEF DESCRIPTION OF THE DRAWINGS

The exemplary embodiments will hereinafter be described in conjunction with the following drawing figures, wherein like numerals denote like elements, and wherein:

FIG. 3 is a dataflow diagram illustrating an autonomous driving system that includes the map definition system of the autonomous vehicle, in accordance with various embodiments;

FIG. 4 is a dataflow diagram illustrating the map definition system, in accordance with various embodiments;

FIG. 6 is a flowchart illustrating a control method for defining a map and controlling the autonomous vehicle, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
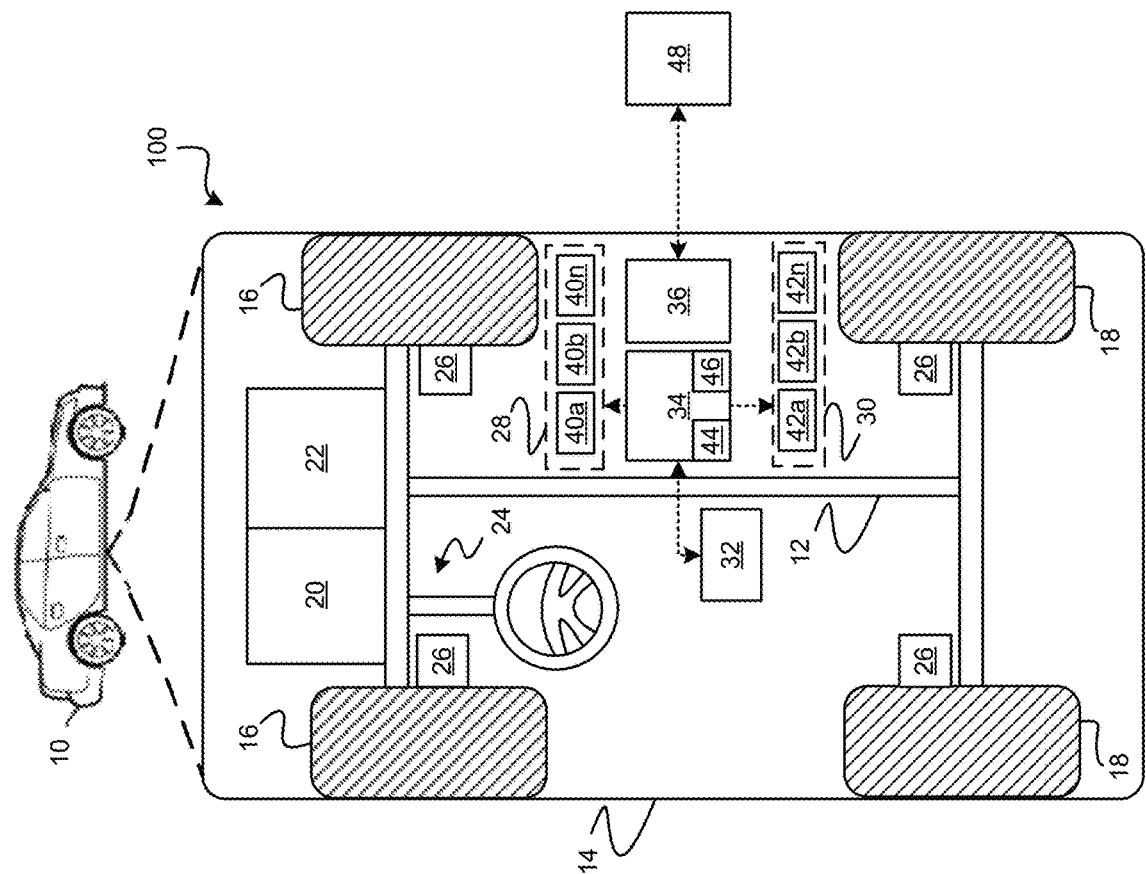
FIG. 1 is a functional block diagram illustrating an autonomous vehicle having a map definition system, in accordance with various embodiments.

With reference to FIG. 1, a map definition system shown generally at 100 is associated with a vehicle 10 in accordance with various embodiments. In general, the map definition system 100 produces map data for use in controlling the vehicle 10. As will be discussed in more detail below, the map definition system 100 produces the map data by learning a distribution of data observed in a defined area using a machine learning model, sampling the distribution a standard number of times to produce sampled data, and using the sampled data to infer, through application of a convolutional neural network (CNN), the positions of road edges and lane lines which are incorporated into a map of the area.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the map definition system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
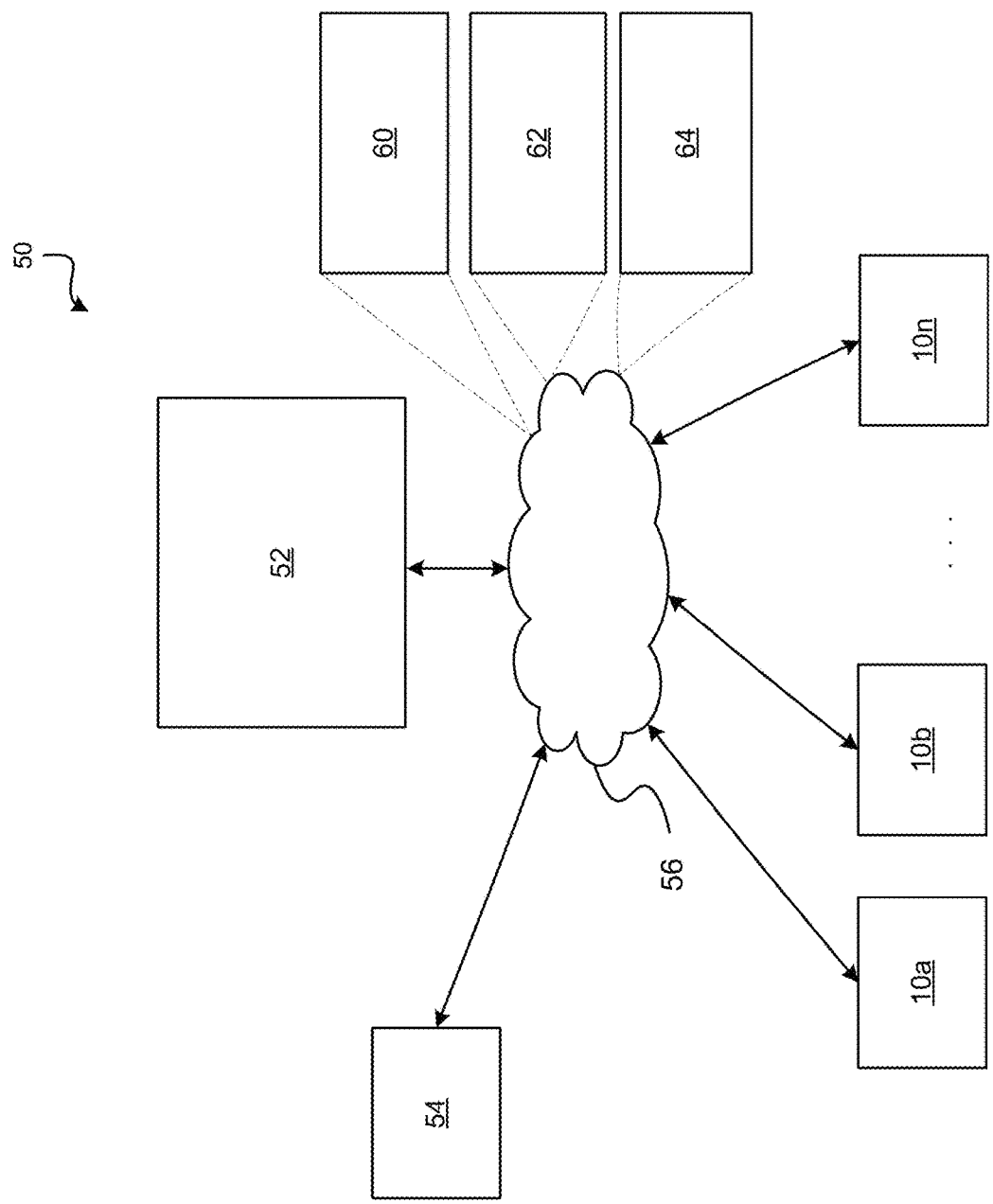
FIG. 2 is a functional block diagram illustrating a transportation system associated with the autonomous vehicle, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the maps are defined by the map definition system 100. In various embodiments, the defined maps may include maps that are predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the map definition system 100 and, when executed by the processor 44, receives telemetry data from the sensor system 28, learns a distribution of the telemetry data observed in a defined area using a machine learning model, samples the distribution a standard number of times to produce sampled data, and uses the sampled data to infer, through application of a convolutional neural network (CNN), the positions of road edges and lane lines which are incorporated into a map of the area (e.g., by modifying the map based on aerial images and/or by creating a new map) that is stored, for example, in the data storage device 32.

The instructions store and transfer distributions with sizes that only depend on the geometry of the road in place of raw telemetry data, which can be very large in high traffic areas. The distribution can be sampled in place to get data that can be used to infer lane lines and road edges. Additionally, the models can be sampled as many times as necessary, allowing for sufficiently dense sample data to be retrieved, even if the original set of data was too sparse to produce good density plots. This process allows for identifying lane lines and road edges without depending on aerial imagery while improving computational throughput.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site, or they could be remotely located from one another, each base station could be responsible for a single cell tower, or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the map definition system 100 of FIG. 1 is included within the ADS 70, for example, as a separate system or part of, for example, the guidance system 78. For example, as shown in more detail with regard to FIG. 4 and with continued reference to FIG. 3, the map definition system 100 includes a distribution module 102, a sample module 104, a prediction module 106, a map generation module 108, and a convolutional neural network datastore 110.

The distribution module 102 receives as input telemetry data 112. In various embodiments, the telemetry data 112 includes position data, speed data, heading data, and a time difference data and can be received from sensors of the autonomous vehicle 10 and or from other vehicles in the area. The distribution module 102 learns a distribution of the telemetry data 112 observed in a defined area using a machine learning model and generates distribution data 114 based thereon.

Figure 5A:
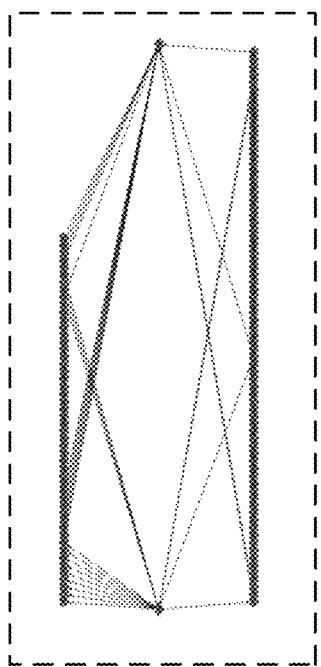
FIGS. 5A, 5B, 5C, and 5D are illustrations of example data produced by the map definition system, in accordance with various embodiments.

For example, as shown in FIG. 5A, in various embodiments, the telemetry data 112 is assembled into a path of points that the vehicle 10 has travelled along a road segment and the path is associated with lines normal to the road segment. The normal lines may be equally spaced and/or spaced according to defined increments along the roads segment. The distribution module 102 then generates a transition graph by evaluating multiple paths generated for the road segment, for example, from a plurality of vehicles.

Figure 5B:
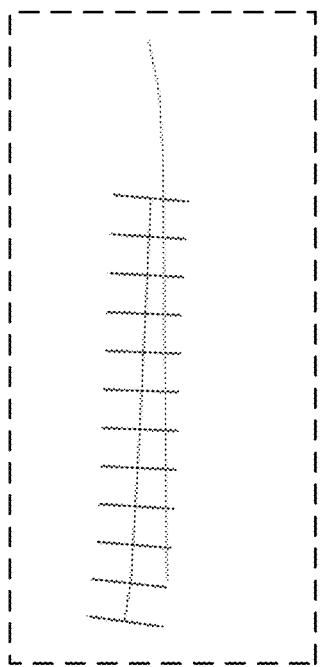

For example, as shown in FIG. 5B, in various embodiments, the distribution module 102 defines each intersection of a path and with a normal line as a node of the graph. The distribution module 102 maintains a count of how many paths visit each pair of nodes in sequence. The distribution module 102 includes an edge in the transition graph for each pair of nodes that occurs more than a defined number of times relative to the total number of paths.

Figure 5D:
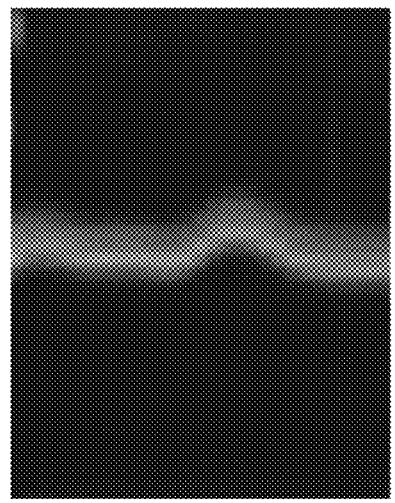
Figure 5C:
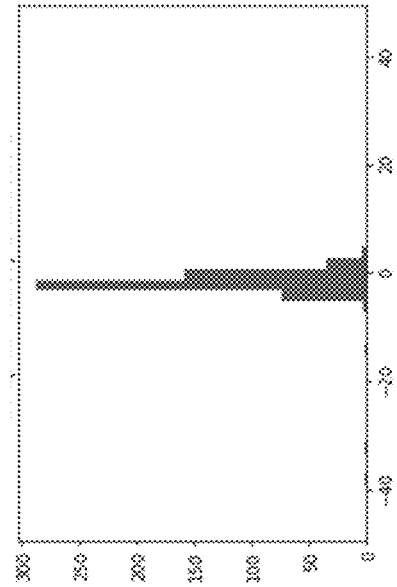

The distribution module 102 then, for each node, initializes a conditional distribution to describe the log likelihood of each successor node. The distribution module 102 then, for each edge, initializes a conditional distribution to describe the log likelihood of the position, speed, heading, and time difference at the target node according to the position, speed, and heading at the source node. The distribution module 102 uses a machine learning modules such as an expectation maximization model to train these distributions according to the observed telemetry data 112 and produces the distribution data 114 for example, as shown in FIG. 5C, based thereon.

With reference back to FIG. 3, the sample module 104 receives as input the distribution data 114. The sample module 104 samples the distribution data a number of times to produce density image data 116. For example, the sample module 104 samples the distribution data 114 by repeatedly choosing a successor node according to the log likelihood determined at the current node. The sample module 104 then chooses parameters according to the distribution on an edge corresponding to the selected successor node, and repeats this process as many times as necessary to generate the density image data 116 comprising a density image, for example, as shown in FIG. 5D.

The prediction module 106 receives as input the density image data 116. The prediction module 106 predicts road edges and lane lines using a trained machine learning model and generates road edge data 120 and lane line data 122 based thereon. For example, the prediction module 106 retrieves a trained convolutional neural network 118 from the CNN datastore 110. The prediction module 106 processes the density image data 116 with the trained CNN 118 to predict the positions of lane lines and road edges and to generate the data 120, 122.

The map generation module 108 receives as input the road edge data 120 and the lane line data 122. The map generation module 108 generates map data 124 of the local environment based on the road edge data 120 and the lane line data 122. The map data 124 is then stored in the data storage device 32 and/or used in directly controlling the autonomous vehicle 10 by the ADS 70.

Referring now to FIG. 6, and with continued reference to FIGS. 1-4, a flowchart illustrates a control method 200 that can be performed by the map definition system 100 of FIGS. 1 and 4 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 200 can be scheduled to run based on one or more predetermined events, and/or can run continuously during operation of the autonomous vehicle 10.

In various embodiments, the method 200 may begin at 205. The telemetry data 112 is received and assembled into paths at 210. The transition graph is determined from the telemetry data 112 at 212. The distribution data 114 is then learned from the telemetry data 112 using a machining learning model at 214. The distribution data 114 is then sampled a defined number of times to produce the density image data 116 at 216. The density image data 116 is then processed with the trained CNN 118 to produce the predictions of positions of the lane lines and road edges at 218. Thereafter, the predictions are incorporated in the map data at 124 which can be used to control the vehicle 10 at 220. Thereafter, the method 200 may end at 222.

Accordingly, the methods, systems, and vehicles described herein provide for improved ways for producing map data used and controlling a vehicle and, accordingly, the claimed embodiments effectuate an improvement in the field of.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of generating map data for use in controlling a vehicle, the method comprising:
   receiving, by a processor, telemetry data;
   determining, by the processor, distribution data of a path based on the telemetry data, including by:
   determining information for a transition graph by counting a number of paths visit each pair of nodes in sequence, and including an edge for each pair of nodes that occurs more than a threshold number of times relative to a total number of path; and
   initializing, for each node, a conditional distribution to describe a log likelihood of each successor node, and
   initializing, for each edge between a source node and a target node, a conditional distribution to describe a log likelihood of a position, a speed, a heading, and a time difference at the target node according to a position, a speed, and a heading at the source node;
   determining, by the processor, sample data based on a first machine learning model and the distribution data;
   generating, by the processor, both lane line data and road edge data based on the sample data and a second machine learning model;
   assembling, the via the processor, the telemetry data into a path of points that the vehicle has travelled along a road segment and the path is associated with a plurality of lines that are normal to the road segment, wherein the normal lines are equally spaced according to defined increments along the road segment;
   defining, via the processor, each intersection of a path with a normal line as a node of the transition graph;
   generating, via the processor, the transition graph by evaluating multiple paths generated for the road segment from a plurality of vehicles;
   generating, via the processor, the map data using the transition graph; and
   storing, by the processor, the map data including the lane line data and road edge data and controlling the vehicle based on the map data.

2. The method of claim 1, wherein the telemetry data includes a position, a speed, a heading, and a time difference observed from an area in an environment.

3. The method of claim 1, wherein the second machine learning model includes a convolutional neural network, and wherein the first machine learning model includes an expectation maximization model.

4. The method of claim 1, wherein the method further comprises using an expectation maximization model to train the distribution data according to the telemetry data.

5. The method of claim 1, wherein the method further comprises controlling the vehicle based on the map data.

6. The method of claim 1, wherein the determining the plurality of sample data comprises sampling the distribution data by repeatedly choosing a successor node from a plurality of nodes according to a log likelihood at a current node, and selecting parameters according to the distribution data on an edge corresponding to the successor node.

7. The method of claim 6, wherein the determining the plurality of sample data comprises repeating the choosing and selecting a plurality of times to produce density image data comprising a density image.

8. The method of claim 7, further comprising:
   processing, via the processor, the density image data, including the density image, with a trained convolutional neural network (CNN) model to produce predictions of positions of the lane lines and road edges, and incorporating the predictions in the map data for use in controlling the vehicle.

9. A vehicle, comprising:
   an autonomous driving system configured to control the vehicle based on map data; and
   a map definition module configured to, by a processor:
   receive telemetry data;
   determine distribution data of a path based on the telemetry data, including by:
   determining information for a transition graph by counting a number of paths visit each pair of nodes in sequence, and including an edge for each pair of nodes that occurs more than a threshold number of times relative to a total number of path; and initializing, for each node, a conditional distribution to describe a log likelihood of each successor node, and initializing, for each edge between a source node and a target node, a conditional distribution to describe a log likelihood of a position, a speed, a heading, and a time difference at the target node according to a position, a speed, and a heading at the source node;

determine a plurality of sample data based on a first machine learning model and the distribution data;

generate both line data and road edge data based on the sample data and a second machine learning model;

assemble the telemetry data into a path of points that the vehicle has travelled along a road segment and the path is associated with a plurality of lines that are normal to the road segment, wherein the normal lines are equally spaced according to defined increments along the road segment;

define each intersection of a path with a normal line as a node of the transition graph;

generate the transition graph by evaluating multiple paths generated for the road segment from a plurality of vehicles;

generate the map data using the transition graph; and store the map data including the lane line data and road edge data and control the vehicle using the map data.

10. The vehicle of claim 9, wherein the processor is further configured to process the density image data, including the density image, with a trained convolutional neural network (CNN) model to produce predictions of positions of the lane lines and road edges, and incorporating the predictions in the map data for use in controlling the vehicle.

11. A computer implemented system for generating map data used in controlling a vehicle, the system comprising:

a non-transitory computer readable medium configured to store instructions; and a processor configured to perform the instructions in order to carry out a method, the method comprising:

receiving, by a processor, telemetry data;

determining, by the processor, distribution data of a path based on the telemetry data, including by:

determining information for a transition graph by counting a number of paths visit each pair of nodes in sequence, and including an edge for each pair of nodes that occurs more than a threshold number of times relative to a total number of path; and initializing, for each node, a conditional distribution to describe a log likelihood of each successor node, and initializing, for each edge between a source node and a target node, a conditional distribution to describe a log likelihood of a position, a speed, a heading, and a time difference at the target node according to a position, a speed, and a heading at the source node;

determining, by the processor, a plurality of sample data based on a first machine learning model and the distribution data;

generating, by the processor, both lane line data and road edge data based on the sample data and a second machine learning model;

assembling, the via the processor, the telemetry data into a path of points that the vehicle has travelled along a road segment and the path is associated with a plurality of lines that are normal to the road segment, wherein the normal lines are equally spaced according to defined increments along the road segment;

defining, via the processor, each intersection of a path with a normal line as a node of the transition graph;

generating, via the processor, the transition graph by evaluating multiple paths generated for the road segment from a plurality of vehicles;

generating, via the processor, the map data using the transition graph; and storing, by the processor, the map data including the lane line data and road edge data and controlling the vehicle based on the map data.

12. The system of claim 11, wherein the telemetry data includes a position, a speed, a heading, and a time difference observed from an area in an environment.

13. The system of claim 11, wherein the second machine learning model is a convolutional neural network.

14. The system of claim 11, wherein the threshold number of times is relative to a total number of paths.

15. The system of claim 11, wherein the processor is further configured to process the density image data, including the density image, with a trained convolutional neural network (CNN) model to produce predictions of positions of the lane lines and road edges, and incorporating the predictions in the map data for use in controlling the vehicle.

16. The system of claim 11, wherein the method further comprises using expectation maximization to train the distribution data according to the telemetry data.

17. The system of claim 11, wherein the determining the plurality of sample data comprises sampling the distribution data by repeatedly choosing a successor node from a plurality of nodes according to a log likelihood at a current node, and selecting parameters according to the distribution data on an edge corresponding to the successor node.

18. The system of claim 17, wherein the determining the plurality of sample data comprises repeating the choosing and the selecting a plurality of times to produce density image data comprising a density image.

* * * * *